3,641,202
UNSATURATED POLYESTER COMPOSITIONS CONTAINING VINYL POLYPHOSPHONATE COMPOUNDS
Jerome B. Biranowski, New York, and Edward D. Weil, Yonkers, N.Y., assignors to Stauffer Chemical Company, New York, N.Y.
No Drawing. Filed May 28, 1969, Ser. No. 828,781
Int. Cl. C08f 21/00, 21/02
U.S. Cl. 260—869                                12 Claims

ABSTRACT OF THE DISCLOSURE

Flame retardant resinous compositions and polymerizable compositions comprising an ethylenically unsaturated polymerizable polyester and cross-linking compounds containing $CH_2\!=\!C\!<$ groups. A portion of the $CH_2\!=\!C\!<$ groups are derived from vinyl polyphosphonate compounds of the formula:

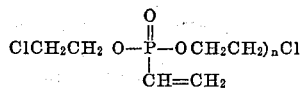

wherein $n$ is a number of at least 2.

BACKGROUND OF THE INVENTION

The present invention relates to novel polymerizable compositions and to flame retardant resinous products obtained therefrom. The polymerizable compositions comprise an ethylenically unsaturated polymerizable polyester and cross-linking compounds containing $CH_2\!=\!C\!<$ groups wherein at least a portion of the cross-linking compounds are vinyl polyphosphonate compounds of the formula:

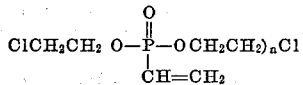

wherein $n$ is a number of at least 2.

The polymerization of the composition of the present invention provides an insoluble, thermoset resin having fire retarding properties. The present invention incorporates fire retardant properties into the resin composition without the destruction of the desirable physical properties possessed by cross-linked ethylenically unsaturated polyester resins.

The cross-linking of ethylenically unsaturated polyesters with compounds containing a $CH_2\!=\!C\!<$ group is old in the art; but the cross-linked polyester resin products are usually highly flammable materials. Attempts to use phosphorus containing compounds as additives to the resin compositions have reduced flammability at the expense of a loss in the desirable physical properties of the resins. In order to improve the physical properties of the cross-linked resin, chemically reactive phosphorus containing compounds containing $CH_2\!=\!C\!<$ groups have been used as cross-linking agents for ethylenically unsaturated polyesters (U.S. 3,163,627), but such compounds result in relatively soft resins. The present invention provides a novel cross-linking agent which is a phosphorus containing compound having a plurality of $CH_2\!=\!C\!<$ groups per molecule, containing halogen atoms and containing a higher percentage of phosphorus per unit weight than compounds of the prior art. The use of the cross-linking compound of the present invention provides a cured polyester resin which is relatively hard and which possesses flame retardant properties. The hard resins are useful in structural applications requiring a resin with flame retardant properties.

SUMMARY OF THE INVENTION

In accordance with the present invention, it has been found that a polymerizable composition comprising an ethylenically unsaturated polyester and cross-linking compounds containing $CH_2\!=\!C\!<$ groups wherein at least a portion of the cross-linking compounds are vinyl polyphosphonate compounds of the formula:

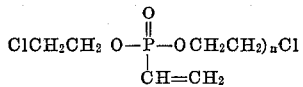

wherein $n$ is a number of at least 2, when polymerized provide a fire retardant insoluble, thermoset resin having properties of a $CH_2\!=\!C\!<$ cross-linked polyester resin.

DETAILED DESCRIPTION OF THE INVENTION

The ethylenically unsaturated polymerizable polyesters useful in the practice of the present invention comprise the residues of the polycondensation of dihydroxy or polyhydroxy aliphatic compounds and dicarboxylic acids or anhydrides. At least a portion of the dicarboxylic acids and anhydrides used to form the polyesters useful in the practice of the present invention must be ethylenically unsaturated aliphatic dicarboxylic acids or anhydrides. Mixtures of ethylenically unsaturated aliphatic dicarboxylic acids or anhydrides with saturated aliphatic dicarboxylic acids or anhydrides, aromatic dicarboxylic acids or anhydrides or mixtures thereof can be used to form the ethylenically unsaturated polyesters useful in the practice of the present invention. The term, ethylenically unsaturated polyester is intended to include the alkyd resins which have been modified by the inclusion of fatty acids, rosin acids and the like into the polyester. The ethylenically unsaturated polyesters are prepared by methods well-known in the art.

The polyesters useful in the practice of the present invention must contain sufficient ethylenic unsaturation so that when cross-linked they provide a resin with physical properties suitable for the intended application. The selection of a a resin with a suitable amount of ethylenic unsaturation is well-known to one skilled in the art.

The dihydroxy and polyhydroxy aliphatic compounds employed to prepare the ethylenically unsaturated polyesters useful in the practice of this invention are aliphatic dihydroxy and polyhydroxy compounds such as ethylene glycol, propylene glycol, butylene glycol, diethylene glycol, triethylene glycol, glycerine, trimethylol ethane and the like.

The ethylenically unsaturated aliphatic dicarboxylic acids or anhydrides employed to make the ethylenically unsaturated polyester resins are compounds such as maleic acid, fumaric acid, itaconic acid, citraconic acid, mesaconic acid, dimethylmaleic acid, methylethylmaleic acid and their anhydrides.

The ethylenically unsaturated dicarboxylic acids and anhydrides may be replaced in part by saturated aliphatic dicarboxylic acids and anhydrides and by aromatic dicarboxylic acids, their anhydrides or by mixtures thereof. Among the saturated aliphatic dicarboxylic acids and anhydrides which are employed to replace a portion of the ethylenically unsaturated dicarboxylic acid in unsaturated polyesters are compounds such as succinic acid or its anhydride, glutamic acid, adipic acid, and pimelic acid.

Among the aromatic dicarboxylic acids and their anhydrides which are employed to replace a portion of the ethylenically unsaturated dicarboxylic acids and their anhydrides are phthalic acid, isophthalic acid, terephthalic acid, their anhydrides and the like.

The fire retardant effectiveness of the phosphorus incorporated into the resin composition by the practice of this invention can be enhanced if the resin composition has incorporated therein a chlorine or bromine containing compound. That is if the unsaturated polyester resin is produced from a composition which contains as a portion of the dicarboxylic acid such acids as bromomaleic acid, chloromaleic acid, chlorodibromophthalic acid, tetrachlorophthalic acid, tetrabromophthalic acid, chlorendic acid, 5,8 - endo-methylene-5,6,7,8,9,9-hexachloro-1,2,3,4, 4a,5,8,8a - octahydronaphthalene - 2,3 - carboxylic anhydride (Chloran®), and the like. The flame retardant properties of the cross-linked resin can also be enhanced by incorporating chlorine or bromine containing dihydroxy alcohols such as 2 - chloro - 1, 3-propanediol, 2,2-bis(bromomethyl) - 1,3 - propanediol, 2,3-dibromo-2-butene-1,4 diol or other bromo and chloro diols into the unsaturated polyesters.

The cross-linking compounds which are used in the present invention are characterized in that they contain the $CH_2=C<$ group. Highly volatile compounds containing the $CH_2=C<$ group, such as ethylene, propylene, vinyl chloride, and vinylidene chloride can be useful as cross-linking agents in the practice of the present invention, but their use requires the employment of high pressure equipment in which the cross-linking occurs.

Since the practical usefulness of the cross-linked resins require that they be cross-linked at or near atmospheric pressure it is preferred to use cross-linking agents having a boiling point of at least about 40° C. The preferred cross-linking agents are the vinyl aromatic compounds, vinyl esters of lower aliphatic acids, that is, acids having up to about 6 carbon atoms, and esters of unsaturated acids having the $CH_2=C<$ groups in the acid radicals such as esters of acrylic and methacrylic acid.

Examples of vinyl aromatic compounds useful in the practice of the present invention include styrene, vinyl toluene, ethylstyrene, propylstyrene, ethylmethylstyrene, vinylxylene, para-phenylstyrene, vinylnaphthalene and divinyl benzene. An improvement in the fire retardant properties of the cross-linked resin may be obtained by using as a cross-linking agent a bromine or chlorine containing vinyl aromatic compound such as 2-chlorostyrene, 3-chlorostyrene, 4-chlorostyrene (or mixtures thereof), 2-bromostyrene, 3-bromostyrene, 4-bromostyrene (or mixtures thereof), dichlorostyrenes such as 2,5-dichlorostyrene and the like.

The vinyl esters of lower aliphatic acids which are useful as cross-linking compounds in the practice of the present invention include vinyl acetate, vinyl propionate, vinyl butyrate, vinyl caproate and the like. The chlorine and bromine derivatives of the vinyl esters can also be utilized and their inclusion generally improves the fire retardant properties of the resin product.

Examples of acrylic esters which are useful as cross-linking compounds in the practice of the present invention include methyl acrylate, ethyl acrylate, butyl acrylate, 2-ethylhexyl acrylate, methyl alpha-chloroacrylate, methyl alpha-bromoacrylate, and alkyl alpha-(2,3,3-trichloroallyl) acrylate. Examples of methacrylic esters which are useful cross-linking agents in the practice of the present invention include methyl methacrylate, ethyl methacrylate and the like. Acrylonitriles such as alpha-chloroacrylonitrile, methacrylonitrile, 2-(2,2,3-trichloroallyl)acrylonitrile and the like are also useful cross-linking agents in the practice of the present invention.

By vinyl polyphosphonate is meant a polymeric compound of the formula:

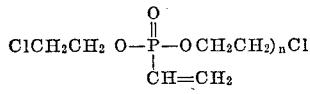

wherein $n$ is a number of at least 2. It is preferred that the vinyl polyphosphonate be a liquid below about 70° C. and be soluble in the unsaturated polyester. The preferred vinyl polyphosphonate compounds are compounds wherein $n$ is a number from about 2 to about 6.

The vinyl polyphosphonate cross-linking compounds:

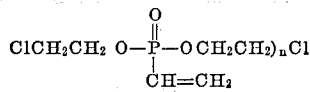

which impart improved physical and fire retardant properties to the polymerized compositions of the present invention is prepared by a novel method which consists of reacting bis(2-chloroethyl)vinylphosphonate in the presence of a basic alkali metal or alkaline earth metal compound such as sodium carbonate, potassium carbonate, lithium carbonate, or the corresponding bicarbonate, calcium hydroxide and the like at a temperature of from about 140° C. to about 250° C. and removing the ethylene dichloride formed. The condensation can be stopped when the amount of ethylene dichloride liberated corresponds to the desired degree of condensation. Any trace of acidity remaining in the reaction product can be neutralized by introducing a small quantity of an epoxide such as ethylene oxide, propylene oxide, epichlorohydrin and the like into the vinyl polyphosphonate. The novel method of preparing the vinyl polyphosphonate is as follows:

EXAMPLE 1

One mole (233 grams) of bis(2-chloroethyl)vinylphosphonate, 1 gram of sodium carbonate and 20 milligrams of hydroquinone (to inhibit gelation) were heated at 186° C.–190° C. for 105 minutes during which time 50.5 grams of ethylene dichloride were distilled from the reaction mixture. The reaction mixture was stripped at 100° C. under a vacuum of 20 millimeters of Hg. The vacuum stripping removed an additional 9.4 grams of ethylene dichloride or a total of 59.9 grams. This corresponds to the formation of a condensation product having the average formula:

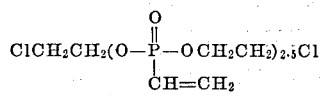

Minor amounts of acidic by-products were removed from the condensation product by the addition of 5% by weight of epichlorohydrin and heated for 1.5 hours at 100° C.

The product was a nearly colorless oil having a refractive index of 1.4862 at 25° C.

Analysis for:

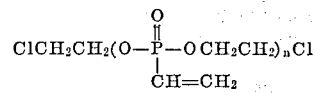

Calculated (percent): P, 18.0; Cl, 16.0. Found (percent): P, 17.0; Cl, 15.3.

The condensation product of bis(2-chloroethyl)vinylphosphonate is useful as a cross-linking compound due to the

groups distributed along the:

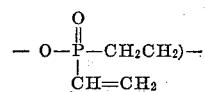

polymer chain. The polymer has a minimum of

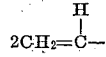

groups per molecule and is therefore an effective cross-linking compound.

The

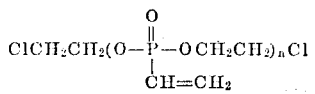

compounds which are most useful are the liquid compounds in which $n$ averages up to about 20; however, it is generally preferred to use compounds where $n$ is below about 6. There is little increase in the proportion of phosphorus in the compound when $n$ becomes larger than 6 and the viscosity increases as $n$ becomes larger. The liquid compounds of moderate viscosity which can be easily incorporated in the resin composition are therefore the preferred materials for use in the practice of the present invention.

The

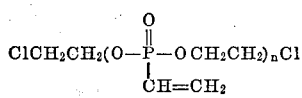

compounds may be added in a ratio of from 0.1 to 2000 parts per 100 parts of ethylenically unsaturated polyester but preferably from about 0.5 to about 1000 parts per 100 parts of polyester. Although it is possible to cross-link the ethylenically unsaturated polyester by the use of the vinyl polyphosphonate compounds alone, due to the high cost of this material it is preferred to blend this material with an alkylene or arylene compound as described herein containing the $CH_2=C<$ group. The alkylene and arylene compounds contribute to the cross-linking and also contribute to the maintenance of the properties of the cross-linked resin. The alkylene, or arylene compounds containing the $CH_2=C<$ groups can be incorporated at a ratio of up to about 100 parts per 100 parts by weight of the unsaturated polyester and preferably from about 5 to about 100 parts per 100 parts by weight of unsaturated polyester.

The flammability of the polymerized compositions of this invention are dependent on the amount of phosphorus incorporated therein. It has been found that from about 0.1% to about 20% phosphorus is effective as a flame retardant, but it is preferred to incorporate from about 0.5% to about 15% phosphorus into the composition. The effect of the phosphorus on the flammability of the resin composition is enhanced if the composition contains halogen incorporated therein. With the incorporation of halogen in the composition, the amount of phosphorus necessary to impart a specific degree of flame retardance is lower than when halogen is not present.

The proportion by weight of the polymeric phosphorus compound:

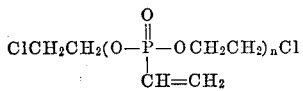

needed to incorporate a specified portion of phosphorus into the resinous composition will depend on the degree of condensation of the vinyl polyphosphonate material that is the magnitude of the value of $n$. When $n$ is 2, the vinyl polyphosphonate compound contains 16.9% phosphorus but when $n$ is 5 the vinyl polyphosphonate compound contains 20.2% phosphorus. The high phosphorus content of the polymeric compounds is an advantage over the monomeric compound which contains only 13.3% phosphorus.

The multiplicity of $CH_2=C<$ groups in the vinyl polyphosphonate compound enable the polyester to be cross-linked with a lower proportion of cross-linking compounds.

The polymerizable composition is cross-linked by the use of a free radical initiator. Any of the free radical initiators known to be effective initiators for vinyl polymerization can be used in the practice of this invention. Only catalytic amounts of from about 0.01% to about 5.0% by weight of the composition of the free radical initiators is required. Free radical initiators which are useful in the practice of the present invention include ultraviolet radiation especially with the addition of a photosensitizer such as benzoin; organic peroxides such as tertiary butyl peroxides, cumyl peroxide, benzoyl peroxide and lauroyl peroxide; hydroperoxides such as cyclohexyl hydroperoxide, cumene hydroperoxide and tert-butyl hydroperoxide; peracids and peresters such as peracetic acid, tert-butyl perisobutyrate, ethyl tert-butyl peroxalate and tert-butyl perbenzoate percarbonates such as diethyl peroxydicarbonate, and diisopropyl peroxydicarbonate; azonitriles such as 2,2′-azo-bis-isobutyronitrile and 2-cyano-2-propyl-azoformamide; azo compounds such as triazobenzene, azo-bis-isobutyramidine and phenyl-azo-triphenylmethane; and ketone peroxides such as methyl ethyl ketone peroxide and methyl amyl ketone peroxide. Activators and promoters such as cobalt vanadium or mixtures thereof in the form of salts or complexes such as ethylhexoate, naphthenate, or acetylacetonates are effective with the ketone peroxide initiators and N,N-dialkylarylamines such as diethyl aniline and aliphatic thiols such as lauryl mercaptan are effective with the acyl peroxides.

The choice of an initiator is familiar to one skilled in the art and is dependent upon the time and temperature conditions under which the artisan chooses to have the cross-linking occur.

The temperature at which the cross-linking occurs is dependent upon the nature of the unsaturated polyester, the cross-linking agent being utilized and the choice of free-radical initiator. The cross-linking generally occurs between about 0° C. and about 200° C. but preferably between about 15° C. and 150° C.

The cross-linking generally takes place at ambient pressure but higher pressure may be used or required when the cross-linking agent has a high volatility. It is preferred to use a cross-linking agent having a boiling point above about 40° C. to obviate the need for reaction under super-atmospheric pressure, but cross-linking agents having boiling points below 40° C. may be used.

The physical and flame retardant properties of the resins produced by the polymerization of the compositions of the present invention can be enhanced by the inclusion therein of fillers, pigments, such as silica, glass fibers, glass cloth, clays and other materials normally utilized by one skilled in the art to enhance the properties of polyester resins. The addition of from about 0.5 to about 10% of antimony oxide to the polymerizable composition can be used to enhance the flame retardant properties of the resin composition.

The advantageous properties of the resins produced by polymerization of the compositions of the present invention can be seen from an examination of the following examples.

All proportions are given by weight unless specifically noted.

EXAMPLE 2

The following polyester resin compositions were prepared as follows: to 28 grams of a composition of a commercial polyester (prepared by polyesterifying 1 mole of phthalic anhydride, 1 mole of maleic anhydride, 2.1 mole of propylene glycol to an acid number less than 50), and cross-linking compounds was added 0.5 gram of a catalyst comprising 0.25 gram of benzoyl peroxide and 0.25 gram of tricresyl phosphate. The 0.5 gram of catalyst was mixed into the composition and the test shapes cast. The castings were cured for 2 hours at 80° C. The flammability of the castings was determined by a method based on Test Method HLT–15 (Encyclopedia of Polymer Science, volume 7, p. 6, 1967). The test results are given as a number of from 0 to 100. A rating of 0 denotes the most flammable and a rating of 100 denotes the least flammable resin. The hardness was determined by the Barcol hardness method, conducted using a Model TYZJ 934.1 Barcol Impressor.

TABLE I

| Component: | Sample 1 | Sample 2 | Sample 3 | Sample 4 |
|---|---|---|---|---|
| Polyester, grams | 17 | 14.75 | 17 | 14.75 |
| Styrene, grams | 11 | 13.25 | 8 | 7.25 |
| Product of Example 1, grams | 0 | 0 | 3.0 | 6.0 |
| Barcol hardness | 45 | 41 | 46 | [1]45 |
| HLT-15 flamability index | 0 | 0 | 60 | 80 |

[1] After 4 hours postcure at 120° C.

As can be seen from Table I, the vinyl polyphosphonates of the present invention impart flame retardance to cross-linked polyester resins while providing a resin with a hardness comparable to a styrene cross-linked resin.

EXAMPLE 3

Polyester resin formulations were prepared according to the method of Example 2 using a commercial polyester prepared by the polyesterification of chlorendic acid, fumaric acid and glycol. All sample castings had numbers of 100 according to a test method based on HLT-15.

The sample castings prepared using the vinyl polyphosphonate of Example 1 produced castings which had the higher Barcol hardness ratings.

The sample castings prepared using the product of Example 1 as a cross-linking compound showed a marked degree of intumenscence when heated in the flame test. The intumenscence provided the sample casting with a thick coating of char which appeared to protect it from further effects of the heating.

EXAMPLE 4

The following compositions were prepared and polymerized at room temperature by exposure to ultraviolet light for 36 hours:

| Parts: | Sample 1 | Sample 2 | Sample 3 | Sample 4 |
|---|---|---|---|---|
| Product Example 1 | 100 | 100 | 100 | 100 |
| Polyester [1] | 0 | 5 | 10 | 20 |

[1] A commercial polyester prepared by polyesterifying 1 mole phthalic anhydride, 1 mole maleic anhydride, 2.1 mole propylene glycol to an acid number less than 50.

All four compositions polymerized and formed hard, solid, thermoset, flame retardant polymers. The compositions containing the ethylenically unsaturated polyester formed resins which were less brittle than the resins formed by the homopolymerization of the product of Example 1.

The following ethylenically unsaturated polyester compositions are polymerized and tested according to the methods of Example 2.

EXAMPLE 5

To 17 grams of a polyester (prepared by the polyesterification of 0.3 mole of purified tetrabromophthalic anhydride, 0.7 mole of phthalic anhydride, 1 mole of maleic anhydride and 2.2 mole of butylene glycol to an acid number less than 50) is added 8 grams of styrene and 3 grams of the product of Example 1. The composition is polymerized by the addition of 0.5 gram of a catalyst comprising 0.25 gram of benzoyl peroxide and 0.25 gram of tricresyl phosphate and curing at 80° C. for 2 hours.

EXAMPLE 6

To 17 grams of a polyester (prepared by the polyesterification of 0.5 mole of phthalic anhydride, 0.5 mole succinic anhydride, 1 mole maleic anhydride and 2.1 mole of ethylene glycol to an acid number less than 50) is added 7 grams of para chlorostyrene and 4 grams of the product of Example 1. The composition is polymerized by the addition of 0.25 gram of tertiary butyl perbenzoate and curing at 80° C. to 100° C. for 10 hours.

EXAMPLE 7

To 17 grams of a polyester (prepared by the polyesterification of 1 mole of itaconic anhydride, 1 mole 5,8 - endo - methylene-5,6,7,8,9,9-hexachloro-1,2,3,4,4a,5, 8,8a - octahydronaphthalene - 2,3 - carboxylic anhydride ("Chloran"®) and 2.2 moles of diethylene glycol to an acid number less than 50) is added 8 grams of styrene and 3 grams of the product of Example 1. The composition is polymerized by the addition of 1 gram of a catalyst comprising 0.5 gram of benzoyl peroxide and 0.5 gram of tricresyl phosphate and curing at 80° C. for 6 hours.

EXAMPLE 8

To 17 grams of a polyester (prepared by the polyesterification of 1 mole of tetrachlorophthalic anhydride, 1 mole of fumaric acid and 2.2 moles of butylene glycol to an acid number less than 50) is added 6 grams of vinyl acetate and 5 grams of the product of Example 1. The composition is polymerized by the addition of 2% methyl ethyl ketone peroxide, 0.2% cobalt naphthenate, 0.2% vanadium naphthenate, and 0.5% diethylaniline. The composition is held at room temperature until cured.

EXAMPLE 9

To 17 grams of a polyester (prepared by the polyesterification of 1 mole phthalic anhydride, 1 mole linolenic acid, 0.5 mole maleic anhydride and 1 mole glycerine to an acid number less than 75) is added 5 grams of ethyl acrylate and 6 grams of a vinyl polyphosphonate of the following formula:

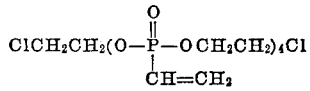

The composition is polymerized by the addition of 0.5 gram of azobisisobutyronitrile, and the composition is cured at 70° C. to 100° C. for 24 hours.

EXAMPLE 10

To 17 grams of a polyester (prepared by the polyesterification of 2 mole adipic acid, 1 mole maleic anhydride and 3.2 moles propylene glycol to an acid number less than 50) is added 1 gram of divinylbenzene, 5 grams of dichlorostyrene and 5 grams of a vinyl polyphosphonate of the following formula:

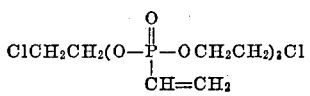

The composition is polymerized by the addition of 0.5 gram of benzoyl peroxide. The composition is cured at 100° C. for 16 hours.

EXAMPLE 11

To 17 grams of a polyester (prepared by the polyesterification of 1 mole phthalic anhydride, 1 mole maleic anhydride, 1.2 mole 2,2-bis(bromomethyl)-1,3-propanediol, and 1 mole propylene glycol to an acid number less than 50) is added 7 grams of styrene, 4 grams of the product of Example 1, and 9 grams of chopped fiber glass mat. The composition is polymerized by the addition of 0.3 gram of benzoyl peroxide and cured in a press for 30 minutes at 110° C. to 130° C. to obtain a hard laminate.

The polymerized compositions of the present invention are generally hard resins and have physical properties comparable to those of the $CH_2=C<$ cross-linked polyester resins.

What is claimed is:

1. A polymerizable composition of matter comprising an ethylenically unsaturated polyester and cross-linking compounds containing the $CH_2=CH<$ group wherein at least a portion of the cross-linking compounds, comprising from about 0.5 to 1,000%, by weight, of said polyester, are vinyl polyphosphonates of the formula:

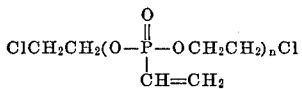

wherein $n$ is a number having a value of at least 2 to which has been added a neutralizing quantity of an epoxide reagent selected from the group consisting of ethylene oxide, propylene oxide, and epichlorohydrin.

2. The composition of claim 1 comprising:
(a) 100 parts of an unsaturated polyester
(b) from 0.5 to 1,000 parts of a vinyl polyphosphonate of the formula:

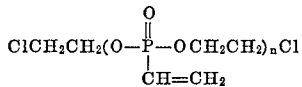

wherein $n$ is a number having a value of at least 2, and (c) up to 100 parts of a monomeric compound having at least one $CH_2=C<$ group.

3. The composition of claim 2 wherein the monomeric compound having at least one $CH_2=C<$ group is selected from the group consisting of styrene, divinyl benzene, chlorostyrene, vinyl acetate, ethyl acrylate and dichlorostyrene.

4. The composition of claim 1 wherein the cross-linking compounds having $CH_2=C<$ groups are compounds with boiling points above about 40° C.

5. The composition of claim 1 wherein the polyester is a product of the polyesterification of a composition comprising maleic anhydride, phthalic anhydride and propylene glycol.

6. The composition of claim 1 wherein the polyester is a product of the polyesterification of a composition comprising chlorendic acid, fumaric acid and glycol.

7. The composition of claim 1 wherein the polyester is a product of the polyesterification of a composition comprising purified tetrabromophthalic anhydride, phthalic anhydride, maleic anhydride and butylene glycol.

8. The composition of claim 1 wherein the polyester is a product of the polyesterification of a composition comprising phthalic anhydride, succinic anhydride, maleic anhydride and ethylene glycol.

9. The composition of claim 1 wherein the polyester is a product of the polyesterification of a composition comprising 5,8-endo-methylene-5,6,7,8,9,9-hexachloro-1,2,3,4,4a,5,8,8a-octahydronaphthalene-2,3-carboxylic anhydride and diethylene glycol.

10. The composition of claim 1 wherein the polyester is a product of the polyesterification of a composition comprising tetrachlorophthalic acid, fumaric acid and butylene glycol.

11. The composition of claim 1 wherein the polyester is a product of the polyesterification of a composition comprising phthalic anhydride, linolenic acid, maleic anhydride and glycerine.

12. The composition of claim 1 wherein the polyester is a product of the polyesterification of a composition comprising adipic acid, maleic anhydride, and propylene glycol.

References Cited

UNITED STATES PATENTS

| | | | |
|---|---|---|---|
| 2,854,434 | 9/1958 | Beaman | 260—899 |
| 3,163,627 | 12/1964 | Craver | 260—861 |

FOREIGN PATENTS

| | | |
|---|---|---|
| 1,098,707 | 7/1961 | Germany. |

OTHER REFERENCES

Yuldashev et al.: Uzbeksk. Khim. Zh. 7 (6), 71–5 (1963).

Li et al.: Plasticheskie Massy 1954 (2), 12–16.

MELVIN GOLDSTEIN, Primary Examiner

U.S. Cl. X.R.

260—40 R, 870, DIG 24

UNITED STATES PATENT OFFICE
CERTIFICATE OF CORRECTION

PO-1050
(5/69)

Patent No. 3,641,202          Dated February 8, 1972

Inventor(s) Jerome B. Biranowski and Edward D. Weil

It is certified that error appears in the above-identified patent and that said Letters Patent are hereby corrected as shown below:

In the Abstract, column 1, lines 20 through 25; in the Background of the Invention, column 1, lines 36 through 40; in the Summary of the Invention, column 2, lines 8 through 11; in column 3, lines 66 through 70; and column 4, lines 2 through 4, the correct formula should be:

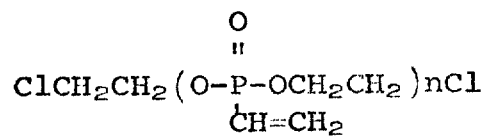

Column 2, line 41, after "selection of a" delete a.
Column 3, line 61, the correct formula should be: 2-(2,3,3-trichloroallyl)acrylonitrile.
Column 4, line 42, "heated" should be -- heating --.
Column 4, lines 47 through 49, the correct formula should be:

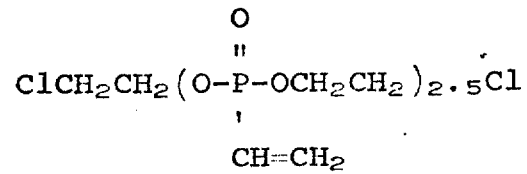

Column 4, lines 61 through 64, the correct formula should be:

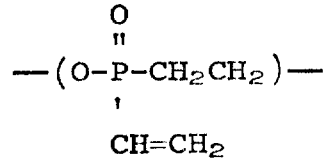

Column 7, line 12, TABLE I, "flamability" should read -- flammability --.
Column 8, line 24, "0.5%" should read -- 0.05% --.

Signed and sealed this 18th day of July 1972.

(SEAL)
Attest:

EDWARD M. FLETCHER, JR.          ROBERT GOTTSCHALK
Attesting Officer                Commissioner of Patents

PO-1050
(5/69)

UNITED STATES PATENT OFFICE
CERTIFICATE OF CORRECTION

Patent No. 3,641,202          Dated February 8, 1972

Inventor(s) Jerome B. Biranowski and Edward D. Weil

It is certified that error appears in the above-identified patent and that said Letters Patent are hereby corrected as shown below:

Claim 1, line 3, the formula reading:

$CH_2=CH<$          should read    $CH_2=C<$

Signed and sealed this 28th day of November 1972.

(SEAL)
Attest:

EDWARD M. FLETCHER, JR.
Attesting Officer

ROBERT GOTTSCHALK
Commissioner of Patents